US012699019B2

(12) United States Patent
Mahdjoubi Namin et al.

(10) Patent No.: US 12,699,019 B2
(45) Date of Patent: Aug. 4, 2026

(54) LEAKAGE DETECTOR SYSTEM

(71) Applicant: ORBITAL SYSTEMS AB, Malmö (SE)

(72) Inventors: Amir Mehrdad Mahdjoubi Namin, Malmö (SE); Markus Friberg, Malmö (SE); Dick Hammer, Lund (SE); Michael Ridell, Staffanstorp (SE)

(73) Assignee: ORBITAL SYSTEMS AB, Malmo (SE)

( * ) Notice: Subject to any disclaimer, the term of this patent is extended or adjusted under 35 U.S.C. 154(b) by 0 days.

(21) Appl. No.: 19/256,685

(22) Filed: Jul. 1, 2025

(65) Prior Publication Data

US 2026/0029291 A1    Jan. 29, 2026

Related U.S. Application Data

(63) Continuation of application No. 17/631,643, filed as application No. PCT/SE2020/050761 on Aug. 4, 2020, now abandoned.

(51) Int. Cl.
G01M 3/04 (2006.01)
E03F 5/04 (2006.01)

(52) U.S. Cl.
CPC ............. G01M 3/04 (2013.01); E03F 5/0407 (2013.01)

(58) Field of Classification Search
CPC ........ G01M 3/04; G01M 3/2815; G01M 3/26; G01M 3/165; E03F 5/0407; G08C 17/02; H02J 7/00; H02J 2207/50

USPC .............................................. 73/40
See application file for complete search history.

(56) References Cited

U.S. PATENT DOCUMENTS

| | | | | |
|---|---|---|---|---|
| 4,598,273 A | * | 7/1986 | Bryan, Jr. ............. | E04D 13/006 |
| | | | | 73/304 R |
| 6,526,807 B1 | * | 3/2003 | Doumit ................... | G01M 3/04 |
| | | | | 73/40.5 R |
| 7,114,388 B1 | * | 10/2006 | French .................... | G01W 1/00 |
| | | | | 73/170.16 |
| 7,551,058 B1 | * | 6/2009 | Johnson ............... | G01N 27/226 |
| | | | | 709/213 |
| 2006/0225796 A1 | * | 10/2006 | Hendrix ............... | G01F 15/003 |
| | | | | 137/624.12 |
| 2006/0272830 A1 | * | 12/2006 | Fima .................... | F24H 15/212 |
| | | | | 169/16 |
| 2017/0138881 A1 | * | 5/2017 | Krapf ................... | G01N 33/383 |
| 2018/0103361 A1 | | 4/2018 | Virhiä | |
| 2018/0112376 A1 | | 4/2018 | Beger et al. | |
| 2018/0238852 A1 | * | 8/2018 | Jilg ....................... | G01N 33/383 |
| 2021/0298557 A1 | * | 9/2021 | Budampati ............ | G01M 3/04 |

FOREIGN PATENT DOCUMENTS

| | | | | |
|---|---|---|---|---|
| EP | 2341490 A1 | * | 7/2011 | ............. G08B 13/04 |
| EP | 3274518 B1 | * | 7/2019 | ............. G01M 3/16 |
| JP | 2006/053057 A | | 2/2006 | |
| JP | 2008/233031 A | | 10/2008 | |
| JP | 2010/145329 A | | 7/2010 | |

(Continued)

*Primary Examiner* — Marrit Eyassu

(74) *Attorney, Agent, or Firm* — MOSER TABOADA

(57) ABSTRACT

The present invention describes a leakage detector system 1 comprising a sensor unit 2, said sensor unit 2 comprising a moisture sensor 20 and a transmitter, said leakage detector system also comprising an enclosing material 3 embedding the sensor unit 2.

18 Claims, 4 Drawing Sheets

(56)          References Cited

FOREIGN PATENT DOCUMENTS

| | | | | | |
|---|---|---|---|---|---|
| SE | 528963 | C2 | * | 3/2007 | ............ G01M 3/045 |
| WO | WO-2013170973 | A1 | * | 11/2013 | ........... G01N 33/383 |
| WO | WO 2018/158507 | A1 | | 9/2018 | |

* cited by examiner

Top view

Bottom view

LEAKAGE DETECTOR SYSTEM

CROSS-REFERENCE TO RELATED APPLICATIONS

This application is a continuation application of U.S. patent application Ser. No. 17/631,643 filed Jan. 31, 2022, which is a national stage filing of and claims priority to and the benefit of International Patent Application No. PCT/SE2020/050761, which was filed on Aug. 4, 2020, and which claims the benefit of and priority to Sweden application 1950916-5, which was filed on Aug. 6, 2019, Sweden application 1950949-6, which was filed on Aug. 20, 2019, and Sweden application 1950915-7, which was filed on Aug. 6, 2019 the entire contents of each of which is incorporated herein by reference.

FIELD OF THE INVENTION

The present invention relates to a leakage detector system.

SUMMARY OF THE INVENTION

The present invention relates to a leakage detector system comprising a sensor unit, said sensor unit comprising a moisture sensor and a transmitter, said leakage detector system also comprising an enclosing material embedding the sensor unit.

The concept according to the present invention, in its broadest sense, is directed to an arrangement where a moisture sensor is arranged in a location where a water leakage should be very problematic, such as on the intended dry side of a moisture barrier, and wherein said sensor unit is embedded by an enclosing material, such as e.g. part of the material constituting the actual moisture barrier. In line with this, according to one embodiment of the present invention, the enclosing material is at least a part of a moisture barrier.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. However, the appended drawings illustrate only typical embodiments of the disclosure and are therefore not to be considered limiting of scope, for the disclosure may admit to other equally effective embodiments.

Figure 1:
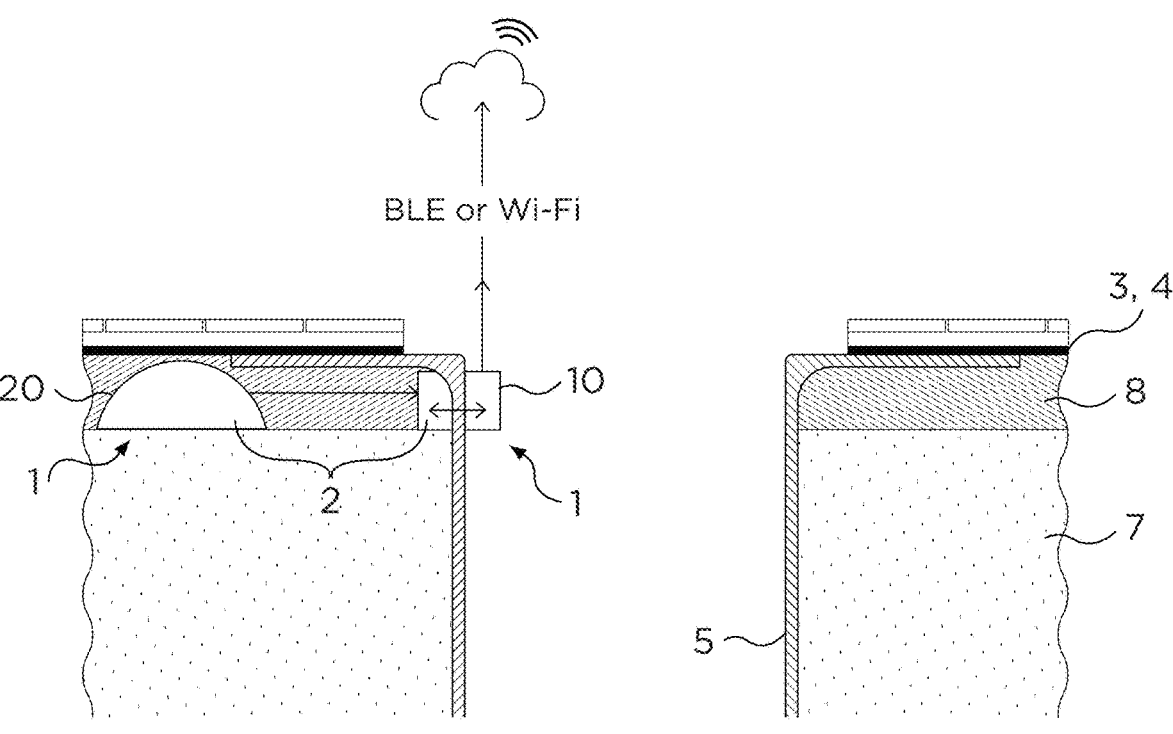
FIG. 1 shows a leakage detector system in accordance with some embodiments of the present disclosure.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

SPECIFIC EMBODIMENTS OF THE INVENTION

Below specific embodiments of the present invention are disclosed and discussed further.

According to one specific embodiment of the present invention, the enclosing material is an embedment arrangement, preferably a hermetically sealing. It should once again be said that the embedment arrangement may in fact be part of the moisture barrier as provided. Moreover, the embedment arrangement may also be provided as a separate cover for the moisture sensor, which full unit then is arranged "beneath" the moisture barrier.

According to yet another specific embodiment, the transmitter is arranged to enable to send a signal through the enclosing material.

Furthermore, according to yet another specific embodiment of the present invention, the leakage detector system also comprises a charging unit comprising a battery, said charging unit arranged to enable charging of the sensor unit. Moreover, according to yet another specific embodiment of the present invention, the sensor unit is arranged on a sealed side of a moisture barrier and wherein the charging unit is arranged on the other side of the moisture barrier. One such example is shown in FIG. 1. One advantage with such an arrangement is that the charging unit is simple to access for a user, such as if something has to be replaced, e.g. a battery.

It should be noted that the charging of the sensor unit may be accomplished by different means according to the present invention. One example is to include a piezoelectric element or more in the sensor unit. Minor deformations in the material, e.g. obtained from temperature differences between the concrete and material on top may be used as the driving force to trigger the piezoelectric element(s).

Moreover, it should, however also be noted that the connection between the sensor unit and the charging unit may be provided in different ways according to the present invention. According to one specific embodiment, there is a wire connection between the charging unit and the sensor unit. In such a case the wire may be provided as part of the moisture barrier and for instance be connected to a charging unit which is located inside of a power outlet. In such a case, the charging unit may be charged by the connection to the power outlet.

According to another embodiment of the present invention, there is a wireless connection between the charging unit and the sensor unit, preferably provided with key charging technology. The key charging technology may be provided by e.g. inductance.

Furthermore, the sensor unit suitably comprises a chargeable battery or a supercapacitor. This may then be charged by the charging unit.

Furthermore, according to one specific embodiment, the leakage detector system is arranged with blue-tooth low energy (BLE) technology. BLE can suitably be used as an alternative from a charging unit to a receiver or can also be used between a sensor unit component with another such or between sensor unit and charging unit.

Moreover, according to yet another specific embodiment, the sensor unit is connected to a network bridge arranged to transfer data sent from the transmitter of the sensor unit. In relation to the above it should be noted that one suitable alternative according to the present invention is that the charging unit also functions as a data transmitter. In such a case the charging unit suitably has a wifi connection and may then send data received from the sensor unit to the cloud or a mobile device or the like. As such it is possible for a user to receive real time data in a simple way.

The moisture sensor according to the present invention may be of different types. According to one embodiment, the moisture sensor is a passive sensor, preferably which is activated when getting into contact with moisture. A passive sensor unit may be used in different ways according to the present invention. As an example, a current may be sent from the charging unit to the sensor unit when a control system decides that some data wants to be collected. This may in turn be operated by a signal from another unit. As an example, if a leakage detector system according to the present invention is provided in connection to a shower unit, then the current may be sent e.g. when a shower sequence has been performed. Moreover, in another example, and not only valid in the example of a shower, then a set operation schedule may also decide when to send a "request" from the charging unit to the sensor unit. For instance, in a summer cottage a system according to the present invention may then be set to only make requests when water is consumed, such as based on a signal that the main water inlet is activated.

As should be understood from above, according to one embodiment of the present invention, the leakage detector system is arranged to send a signal to the sensor unit to perform a measurement and send measurement data from the transmitter of the sensor unit to a receiver unit. Moreover, as also hinted above, according to one embodiment of the present invention, the receiver unit and the charging unit is one and the same unit.

Furthermore, according to yet another specific embodiment of the present invention, the leakage detector system is arranged to send a signal to the sensor unit to perform a measurement and send measurement data from the transmitter of the sensor unit to a receiver unit based on the existence of another external event, such as when a shower unit has been operated, water has been fed into a system, or the like. As mentioned, the unit of the leakage detector system arranged to send a signal to the sensor unit may be the charging unit of the leakage detector system.

Moreover, as also hinted above, according to yet another specific embodiment of the present invention, the charging unit is arranged with a wifi connection to send data.

Also the technology used for the actual moisture sensor according to the present invention may vary. According to the present invention, any type of low power wireless short range data communication is possible to use. According to one specific embodiment of the present invention, the moisture sensor is a near-field communication (NFC) sensor, a so called NFC tag (Rfid). When an electric field is provided over the sensor, then the NFC tag may send data with identification etc. If and when a sensor stops to return a signal, then an alarm may be activated and sent. Moreover, the sensor unit may also comprise additional components. As an example, according to one specific embodiment, the sensor unit also comprises a temperature sensor.

The leakage detector system according to the present invention may be incorporated in many different places, in fact anywhere where there is a risk for a water leak is a potential suitable place for a leakage detector system according to the present invention. One such suitable place is in a close proximity to a floor drain unit. Therefore, according to one specific embodiment of the present invention, the moisture sensor is arranged on a sealed side of a moisture barrier in close proximity to a floor drain unit, e.g. in close proximity to a floor drain unit in a shower.

Moreover, the sensor unit according to the present invention may comprise sensor wires. Such sensor wires may e.g. be arranged around a floor drain unit to provide detection around the entire floor drain unit. As such, if a leakage is detected, then it is also possible to see where the leakage is positioned or at least the direction of the leakage source. Furthermore, sensor wires may also be used according to the present invention to be arranged around feed tubing. As tubing is the most frequent leakage source, this may be used to detect a leakage at a very early stage.

Furthermore, the leakage detector system may also comprise other units. According to one specific embodiment, there is a protection holder arranged between the moisture sensor and the enclosing material. This may be used to simplify some installations of sensor units to ensure that these are encapsulated during the entire installation procedure.

Furthermore, the present invention is also directed to a leakage detector system, as disclosed above, arranged on top of a floor material, e.g. concrete, and embedded in a layer of screed with the moisture barrier arranged on top of the layer of screed.

Moreover, according to yet another specific embodiment, the leakage detector system comprises at least two moisture sensors. This may increase the redundancy and as such diminish the risk for false alarms.

The present invention provides several advantages. Non-limiting examples are the size needed for the sensor units, which is limited in comparison to existing systems, as well as the energy demand to maintain the system operation over a long time. The present invention provides a communication system with an efficient energy use, where BLE is one possible example. Moreover, the present invention also provides efficient scheduled data transmitting with on-demand detection as an example. These advantages provide for a solution which is not demanding in terms of space needed and where the battery time can last for more than 10 years.

DETAILED DESCRIPTION OF THE DRAWINGS

Figures 2A, 2B:
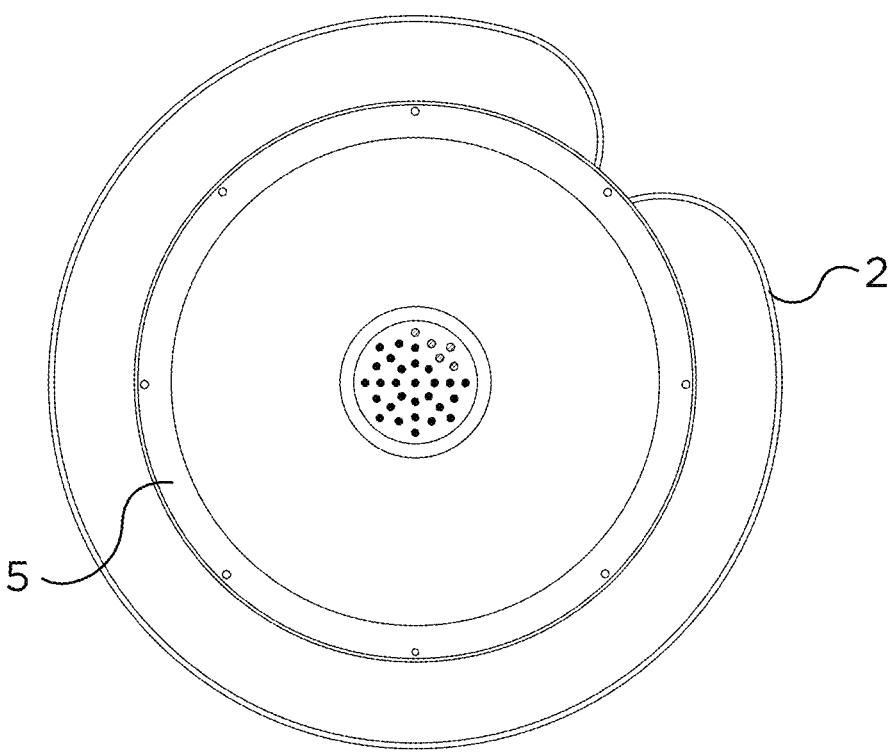
FIGS. 2a and 2b show a leakage detector system in accordance with some embodiments of the present disclosure.

In FIG. 1 there is shown one embodiment of a leakage detector system 1 according to the present invention. The leakage detector system 1 comprises a sensor unit 2 comprising a moisture sensor 20. As notable, in this case the sensor unit 2 also comprises a "mother unit" which in this case is the unit suitably comprising a supercapacitor which is charged by the charging unit 10. It should be noted that such an alternative may also comprise several moisture sensors 20 or sensor wires with nodes or the like as seen in FIGS. 2a and 2b. Furthermore, it is also possible that the sensor unit 2 only is incorporated as one single unit with moisture sensor 20 and charging capabilities etc.

The leakage detector system 1 also comprises an enclosing material 3, in this case being part of the moisture barrier 4. Furthermore, as hinted above, in this embodiment the leakage detector system 1 also comprises a charging unit 10. The charging unit 10 charges the sensor unit 2 which then may send a signal back to the charging unit 10 regarding identification and a moisture alarm or not. From the charging unit 10 this data may then be sent to the cloud or to a mobile device or the like.

As notable, in this embodiment the leakage detector system 1 is located in connection with a floor drain unit 5.

Moreover, shown is also a floor material 7, e.g. concrete, and screed 8.

Furthermore, in FIGS. 2a and 2b there is shown another embodiment of a leakage detector system 1 according to the present invention, also in this case located in connection with a floor drain unit 5. In this specific case the sensor unit 2 comprises sensor wires which are arranged around the floor drain unit 5. As such, if moisture is detected then the direction of the leak around the floor drain unit 5 will also be able to be decided.

Figure 3:
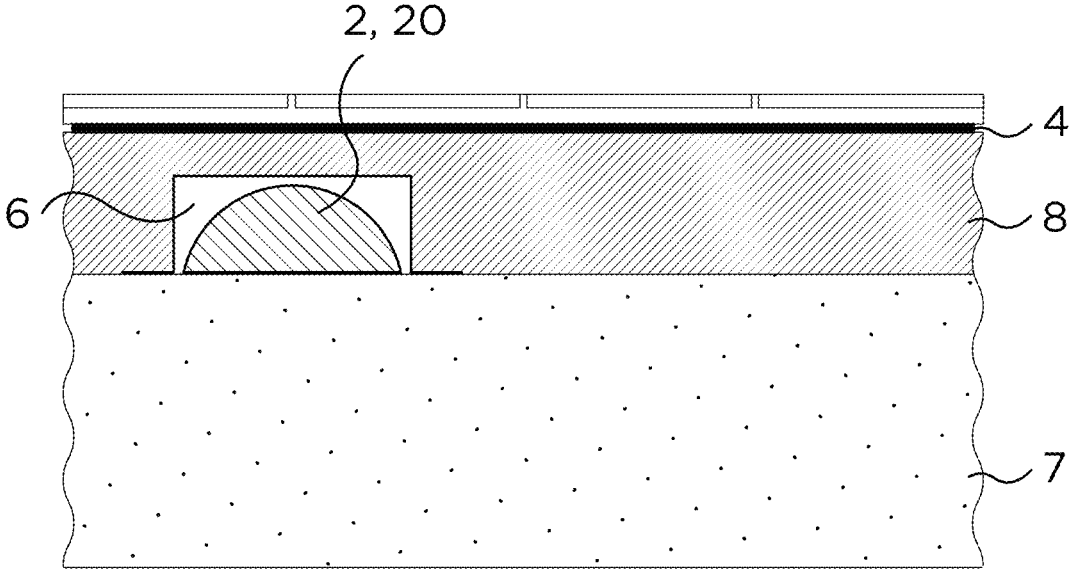
FIG. 3 shows a leakage detector system in accordance with some embodiments of the present disclosure.

In FIG. 3 there is shown yet another specific embodiment of the present invention. In this case there is shown an alternative where the sensor unit 2 is protected by a protection holder 6 arranged between the moisture sensor 20 and the enclosing material 3. In this case, the leakage detector system 1 is arranged on top of a floor material 7, e.g. concrete, and embedded in a layer of screed 8 with the moisture barrier 4 arranged on top of the layer of screed 8. On top of the moisture barrier mortar, plaster or glue is arranged and then finally the outer surface of tiles or e.g. carpet is provided.

A Second Aspect of the Present Invention

According to a second aspect of the present invention this refers to a floor drain unit comprising a leakage detector system comprising a sensor unit, said sensor unit comprising a moisture sensor and a transmitter.

The concept according to the present invention is intended to be used in an arrangement for a floor drain unit where a moisture sensor is arranged on the intended dry side of a moisture barrier created around the floor drain unit, and wherein said sensor unit is embedded by the moisture barrier material.

Specific Embodiments of the Second Aspect of the Present Invention

Below specific embodiments of the present invention are disclosed and discussed further.

According to one specific embodiment of the present invention, the floor drain unit is intended to be arranged in connection with a moisture barrier material arranged to embed the moisture sensor.

According to one specific embodiment, the transmitter is arranged to enable to send a signal through the moisture barrier material.

Furthermore, according to yet another specific embodiment of the present invention, the leakage detector system also comprises a charging unit comprising a battery, said charging unit arranged to enable charging of the sensor unit. Moreover, according to yet another specific embodiment of the present invention, the sensor unit is arranged on a sealed side of a moisture barrier and wherein the charging unit is arranged on the other side of the moisture barrier. One such example is shown in FIG. 1. One advantage with such an arrangement is that the charging unit is simple to access for a user, such as if something has to be replaced, e.g. a battery.

It should be noted that the charging of the sensor unit may be accomplished by different means according to the present invention. One example is to include a piezoelectric element or more in the sensor unit. Minor deformations in the material, e.g. obtained from temperature differences between the concrete and material on top may be used as the driving force to trigger the piezoelectric element(s).

Moreover, it should, however also be noted that the connection between the sensor unit and the charging unit may be provided in different ways according to the present invention. According to one specific embodiment, there is a wire connection between the charging unit and the sensor unit. In such a case the wire may be provided as part of the moisture barrier and for instance be connected to a charging unit which is located inside of a power outlet. In such a case, the charging unit may be charged by the connection to the power outlet.

According to another embodiment of the present invention, there is a wireless connection between the charging unit and the sensor unit, preferably provided with key charging technology. The key charging technology may be provided by e.g. inductance.

Furthermore, the sensor unit suitably comprises a chargeable battery or a supercapacitor. This may then be charged by the charging unit. Furthermore, according to one specific embodiment, the leakage detector system is arranged arranged with blue-tooth low energy (BLE) technology. BLE can suitably be used as an alternative from a charging unit to a receiver or can also be used between a sensor unit component with another such or between sensor unit and charging unit.

Moreover, according to yet another specific embodiment, the sensor unit is connected to a network bridge arranged to transfer data sent from the transmitter of the sensor unit. In relation to the above it should be noted that one suitable alternative according to the present invention is that the charging unit also functions as a data transmitter. In such a case the charging unit suitably has a wifi connection and may then send data received from the sensor unit to the cloud or a mobile device or the like. As such it is possible for a user to receive real time data in a simple way.

The moisture sensor according to the present invention may be of different types. According to one embodiment, the moisture sensor is a passive sensor, preferably which is activated when getting into contact with moisture. A passive sensor unit may be used in different ways according to the present invention. As an example, a current may be sent from the charging unit to the sensor unit when a control system decides that some data wants to be collected. This may in turn be operated by a signal from another unit. As an example, if a leakage detector system according to the present invention is provided in connection to a shower unit, then the current may be sent e.g. when a shower sequence has been performed. Moreover, in another example, and not only valid in the example of a shower, then a set operation schedule may also decide when to send a "request" from the charging unit to the sensor unit. For instance, in a summer cottage a system according to the present invention may then be set to only make requests when water is consumed, such as based on a signal that the main water inlet is activated.

As should be understood from above, according to one embodiment of the present invention, the leakage detector system is arranged to send a signal to the sensor unit to perform a measurement and send measurement data from the transmitter of the sensor unit to a receiver unit. Moreover, as also hinted above, according to one embodiment of the present invention, the receiver unit and the charging unit is one and the same unit.

Furthermore, according to yet another specific embodiment of the present invention, the leakage detector system is arranged to send a signal to the sensor unit to perform a measurement and send measurement data from the transmitter of the sensor unit to a receiver unit based on the existence of another external event, such as when a shower unit has been operated, water has been fed into a system, or the like. As mentioned, the unit of the leakage detector system arranged to send a signal to the sensor unit may be the charging unit of the leakage detector system.

Moreover, as also hinted above, according to yet another specific embodiment of the present invention, the charging unit is arranged with a wifi connection to send data.

Also the technology used for the actual moisture sensor according to the present invention may vary. According to the present invention, any type of low power wireless short range data communication is possible to use. According to one specific embodiment of the present invention, the moisture sensor is a near-field communication (NFC) sensor, a so called NFC tag (Rfid). When an electric field is provided over the sensor, then the NFC tag may send data with identification etc. If and when a sensor stops to return a signal, then an alarm may be activated and sent. Moreover, the sensor unit may also comprise additional components. As an example, according to one specific embodiment, the sensor unit also comprises a temperature sensor.

Moreover, the sensor unit according to the present invention may comprise sensor wires. Such sensor wires may e.g. be arranged around the floor drain unit to provide detection around the entire floor drain unit. As such, if a leakage is detected, then it is also possible to see where the leakage is positioned or at least the direction of the leakage source.

Furthermore, the leakage detector system may also comprise other units. According to one specific embodiment, there is a protection holder arranged between the moisture sensor and the enclosing material. This may be used to simplify some installations of sensor units to ensure that these are encapsulated during the entire installation procedure.

Furthermore, the present invention is also directed to a floor drain unit comprising a leakage detector system, as disclosed above, arranged on top of a floor material, e.g. concrete, and embedded in a layer of screed with the moisture barrier arranged on top of the layer of screed.

Moreover, according to yet another specific embodiment, the leakage detector system comprises at least two moisture sensors. This may increase the redundancy and as such diminish the risk for false alarms.

The present invention provides several advantages. Non-limiting examples are the size needed for the sensor units, which is limited in comparison to existing systems, as well as the energy demand to maintain the system operation over a long time. The present invention provides a communication system with an efficient energy use, where BLE is one possible example. Moreover, the present invention also provides efficient scheduled data transmitting with on-demand detection as an example. These advantages provide for a solution which is not demanding in terms of space needed and where the battery time can last for more than 10 years.

Clauses According to a Second Aspect of the Present Invention

1. Floor drain unit (5) comprising a leakage detector system (1) comprising a sensor unit (2), said sensor unit (2) comprising a moisture sensor (20) and a transmitter.

2. Floor drain unit (5) according to claim 1, wherein the floor drain unit is intended to be arranged in connection with a moisture barrier material (4) arranged to embed the moisture sensor (2).

3. Floor drain unit (5) according to claim 2, wherein the transmitter is arranged to enable to send a signal through the moisture barrier material (4).

4. Floor drain unit (5) according to any of claims 1-3, wherein the leakage detector system (1) also comprises a charging unit (10) comprising a battery, said charging unit (3) arranged to enable charging of the sensor unit (2).

5. Floor drain unit (5) according to claim 4, wherein the sensor unit (2) is arranged on a sealed side of the moisture barrier (4) and wherein the charging unit (10) is arranged on the other side of the moisture barrier (4).

6. Floor drain unit (5) according to claim 4 or 5, wherein there is a wire connection between the charging unit (10) and the sensor unit (2).

7. Floor drain unit (5) according to claim 4 or 5, wherein there is a wireless connection between the charging unit (10) and the sensor unit (2), preferably provided with key charging technology.

8. Floor drain unit (5) according to any of the preceding claims, wherein the sensor unit (2) comprises a chargeable battery or a supercapacitor.

9. Floor drain unit (5) according to any of the preceding claims, wherein the leakage detector system (1) is arranged with blue-tooth low energy (BLE) technology.

10. Floor drain unit (5) according to any of the preceding claims, wherein the sensor unit (2) is connected to a network bridge arranged to transfer data sent from the transmitter of the sensor unit (2).

11. Floor drain unit (5) according to any of the preceding claims, wherein the moisture sensor is a passive sensor, preferably which is activated when getting into contact with moisture.

12. Floor drain unit (5) according to any of the preceding claims, wherein the leakage detector system (1) is arranged to send a signal to the sensor unit (2) to perform a measurement and send measurement data from the transmitter of the sensor unit (2) to a receiver unit.

13. Floor drain unit (5) according to claim 12, wherein the receiver unit and the charging unit (10) is one and the same unit.

14. Floor drain unit (5) according to claim 12 or 13, wherein the leakage detector system (1) is arranged to send a signal to the sensor unit (2) to perform a measurement and send measurement data from the transmitter of the sensor unit (2) to a receiver unit based on the existence of another external event, such as when a shower unit has been operated, water has been fed into a system, or the like.

15. Floor drain unit (5) according to any of claims 4-14, wherein the charging unit (10) is arranged with a wifi connection to send data.

16. Floor drain unit (5) according to any of the preceding claims, wherein the moisture sensor (2) is a near-field communication (NFC) sensor.

17. Floor drain unit (5) according to any of the preceding claims, wherein the sensor unit (2) also comprises a temperature sensor.

18. Floor drain unit (5) according to any of the preceding claims, wherein the sensor unit (2) comprises one or more sensor wires, preferably arranged around the floor drain unit (5).

19. Floor drain unit (5) according to any of the preceding claims, wherein there is a protection holder (6) arranged between the sensor unit (2) and the moisture barrier material (4).

20. Floor drain unit (5) according to any of the preceding claims, wherein the leakage detector system (1) is arranged on top of a floor material (7), e.g. concrete, and embedded in a layer of screed (8) with the moisture barrier (4) arranged on top of the layer of screed (8).

21. Floor drain unit (5) according to any of the preceding claims, wherein the leakage detector system (1) comprises at least two moisture sensors (2).

A Third Aspect of the Present Invention

According to a third aspect of the present invention this refers to a water inlet monitoring unit having the following features:
    one or more flow measuring units;
    one or more water quality measuring units;

a connection unit so that the water inlet monitoring unit may be connected to a water inlet to a house, apartment real estate, hotel, or the like; and a shut off valve or flow redirecting valve.

In relation to the expression "shut off valve or flow redirecting valve" it should be said that the water inlet monitoring unit has the ability to measure flow, and thus potential water leakage, and water quality, and may trigger a valve to close or open (or stay open). This triggering is suitably enabled by a control system. To give some examples, if the flow measuring indicates that a leakage has occurred, then the valve may be closed so that no water is flown into the water distribution system, e.g. in a household. This is also why the valve may be regarded as a hut off valve in some cases. In another potential system, or as a complementary feature, then water may be redirected to another unit instead. For instance, if a low water quality is detected, then the water flow may be directed to a unit where such low water quality may be alright, for instance for flushing a toilet.

The concept according to the present invention is directed to a unit for measuring different parameters, such as water flow, water quality and/or temperature, which all may provide important data in relation to if the water flowing into the house, apartment real estate, hotel or the like is suitable to use, for different purposes, if there is a leak or potential risk for a future leak. Based on this, the shut off valve is also a key feature to be used if unintentional flow occurs. Moreover, also low water quality may trigger the water inlet monitoring unit or a control unit/monitoring system linked thereto to allow for water to only be used for certain applications, such as in a toilet, but not to be used as drinking water. The alarm function may then give an indication to the user that the water is not suitable to drink but can be used for other applications.

Specific Embodiments of the Third Aspect of the Present Invention

Below specific embodiments of the present invention are disclosed and discussed further.

Suitably, the inlet monitoring unit according to the present invention is provided with some kind of communication. According to one specific embodiment of the present invention, the inlet monitoring unit comprises Bluetooth and/or Wi-Fi connection(s). In this regard it should be noted that also other forms are possible, such as 5G, GSM or other types.

Furthermore, according to yet another specific embodiment of the present invention, the inlet monitoring unit comprises an external power supply and/or an internal battery. As will be further explained below, the inlet monitoring unit suitably comprises or is connected to a control system or some kind of operation system. Some parts of the power supply may also be provided into the control system in addition to this or as an alternative to some parts of the power supply.

Moreover, the inlet monitoring unit may comprise several different sensor types. Therefore, according to one specific embodiment of the present invention, the water inlet monitoring unit also comprises a temperature sensor. This sensor may be provided to measure the temperature of the inflowing water, suitably of the cold water inlet. As such, this may function as an alarm of increased freezing risk. Moreover, it should be noted that in households or the like where the cold water and hot water flows into a mixer, then it could be suitable to install two inlet monitoring units according to the present invention, one on the cold water inlet and one on the hot water inlet. It should be noted that a monitoring unit according to the present invention may also only be arranged on the cold water inlet, which cold water may be heated in a boiler to provide for hot water.

Now going back to possible sensors. According to one specific embodiment, the inlet monitoring unit also comprises a sensor for measuring the surrounding temperature. This sensor then measures a temperature outside of the tubing and this may function as a strong indication of frost risk for the tubing. Moreover, in warm climates such a surrounding temperature sensor may also function as an alarm when the cold water is too hot. This may then be regarded as a legionella alarm. To give an example, if a drinking water outlet or a shower unit is connected to the water inlet monitoring unit according to the present invention, then measuring the surrounding temperature, or in fact cold water temperature, may function as an alert function to ensure that this water is not used for drinking or showering and instead sent to waste. This may be handled directly by a control system or only function as an alert function to inform a specific user.

Moreover, according to yet another specific embodiment of the present invention, said one or more water quality measuring units are at least one sensor measuring water conductivity, preferably electric conductivity (EC), or a turbidity sensor, or a combination thereof. A EC value may be used as an indication of the water quality. Measuring the water quality in this may provide for both valuable big data use but also to provide for water quality indication for a specific user or for calibration to units dependent thereof, such e.g. a water recirculation unit, e.g. a recirculating shower. Another possible sensor to incorporate is one or more biosensor(s). To use sensors enabling to measure different type of water properties may be of interest in a unit according to the present invention. Conductivity is one such, but there may also be others.

Furthermore, according to one specific embodiment of the present invention, said one or more flow measuring units are one low flow meter and one high flow meter. To incorporate a flow meter in a lower flow range and a flow meter in a higher flow range, respectively is a way of ensuring a broad measuring range for the water flow. Furthermore, a low flow meter operating by use of pressure may be used according to the present invention.

The water inlet monitoring unit according to the present invention may function as an alert/alarm system. As hinted above, this alarm capability may be directed to frost/freezing risk, which may be very problematic for tubing. Moreover, also low water quality from e.g. the EC measurement may be an alarm indicator. Furthermore, regarding flow this may be used, as explained below in relation to the method according to the present invention, to enable comparison of the instant consumption behavior to the consumption behavior over time. When a consumption behavior is detected, which is clearly outside of the normal detected consumption, then this may indicate a leakage somewhere. This implies that a water inlet monitoring unit according to the present invention may also have water leakage detection capabilities. Furthermore, it should be noted that also other parameters may be measured to be used as single indicators or indicators together with others. One example is to measure the pressure drop inside the tubing. This may also function as an indicator of a leak or of something else problematic.

Furthermore, the water inlet monitoring unit may comprise other means and units. According to one specific embodiment of the present invention, the water inlet monitoring unit comprises both Bluetooth connection and Wi-Fi connection. Moreover, according to yet another specific embodiment of the present invention, the water inlet monitoring unit comprises an external power supply and a battery powered to maintain connectivity at a power shut down.

Moreover, the present invention is also directed to a water distribution system intended for domestic water usage, wherein said water distribution system comprises at least one water inlet monitoring unit according to the present invention. As hinted above, according to one specific embodiment of the present invention, wherein a flow through boiler is provided from a cold water supply to provide for hot water supply. Moreover, the water inlet monitoring unit according to the present invention may also be provided on separate cold and water supplies. Therefore, according to one specific embodiment of the present invention, said water distribution system comprises one water inlet monitoring unit according to the present invention for a hot water inlet and one water inlet monitoring unit according to the present invention for a cold water inlet. If separate monitoring units are installed, then it is of interest that these can communicate with each other so that the full consumption profile may be measured and evaluated.

Furthermore, the present invention also refers to a method for detecting a potential leak or a leak in progress, said method comprising monitoring the flow behavior over time in a water inlet monitoring unit according to the present invention linked to water usage in one or more water usage units. This method may be seen as a kind of AI application where the monitoring unit compares instant data to a user profile and then indicates if the consumption behavior does not seem to be normal and then should indicate a leak.

According to yet another specific embodiment of the present invention, the method comprises comparing a specific flow behavior with the flow behavior over time and if there is a difference in the specific flow behavior compared to the flow behavior over time then sends an alarm to a user. To give an example, this may be driven by measuring the water consumption over time and comparing different time periods, e.g. in a household or a hotel or the like.

Moreover, according to yet another specific embodiment of the present invention, the method also comprises measuring the surrounding temperature to enable to send an alarm when there is a frost risk or legionella growth risk.

With reference to the inlet monitoring unit according to the present invention the following may also be mentioned. Machine learning is very suitable to use as a technology for most applications. To give some examples, most faucets have the same flow/pressure drop profiles, toilets have the same type/size of cisterns and flushing volumes, washing machines have the same volumes and shower units have the same flow speed over time etc. etc. As such, a control unit/measuring system may set user profiles based on all such input only based on measurement of flow and/or volumes used in different units. To link this to the inlet monitoring unit then may act as an alarm/alert system. Red flags may be provided when it is clear that the usage does not correlate with the normal consumption profiles. Examples are leaks, but also a dripping faucet may be such a behavior which should provide a red flag alert.

It is of course more challenging when multi units are used at the same time, but a system according to the present invention may also learn this behavior over time. As an example, even if the system according to the present invention may red flag a certain behavior the first time, if it is notified that the specific event was not something that should indicate leakage, then the system may recognize this the second time such behavior arises.

Based on the above it should be noted that the more units that have a well-defined water usage profile, the better set-up may be obtained for the entire monitoring system. The software used in a control and/or monitoring system according to the present invention will be fully operational quicker in such cases, and in other cases it will have to learn certain things over time. In relation to this it may also be said that a certain user may link different applications to the control and/or monitoring system according to the present invention, and in a start up-phase then the user suitably runs the applications towards the control and/or monitoring system so that everything is set in the beginning. It should be noted that this could be one possible start-up procedure, but also other more automatic directly are totally possible.

Moreover, according to yet another specific embodiment of the present invention there is provided a method comprising using a water inlet monitoring unit according to the present invention, for measuring water quality over time.

Figure 4:
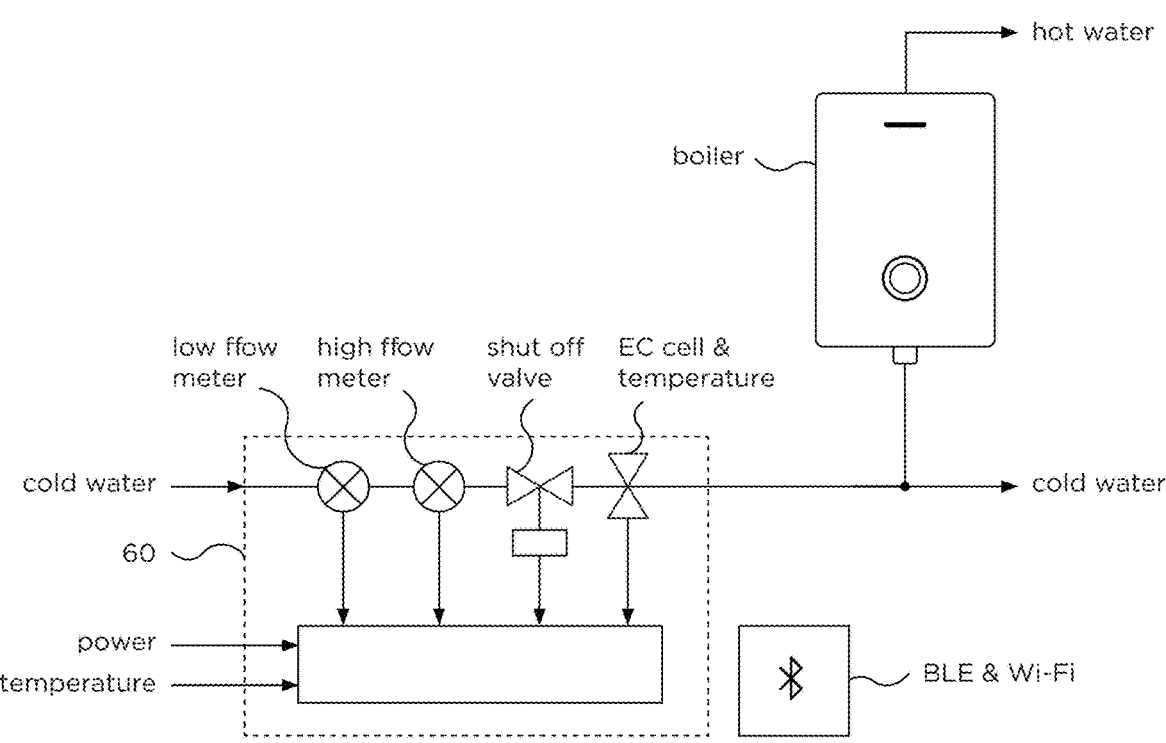
FIG. 4 shows an inlet monitoring unit in accordance with some embodiments of the present disclosure.

Detailed Description of FIG. 4 Relating to the
Third Aspect of the Present Invention In FIG. 4 there is shown one possible embodiment of an inlet monitoring unit 60 according to the present invention. In this case the unit 60 is provided on the cold water inlet. In this case the following functions are provided in the unit 60:

Monitors the actual flow (low and high);

Monitors surrounding and/or the water temperature;

Monitors the water conductivity, such as to be used for big data purposes or calibration for certain water user units;

Involves a shut off valve or flow redirecting valve if unintentional flow occurs;

Has Bluetooth connection and/or Wi-Fi connection;

Has an external power supply;

Has a battery powered to maintain connectivity at power shut down.

Clauses According to a Third Aspect of the Present
Invention

1. A water inlet monitoring unit (60) having the following features:

one or more flow measuring units;

one or more water quality measuring units;

a connection unit so that the water inlet monitoring unit (60) may be connected to a water inlet to a house, apartment real estate, hotel or the like; and a shut off valve or flow redirecting valve.

2. The water inlet monitoring unit (60) according to claim 1, also comprising Bluetooth and/or Wi-Fi connection(s).

3. The water inlet monitoring unit (60) according to claim 1 or 2, also comprising an external power supply and/or an internal battery.

4. The water inlet monitoring unit (60) according to any of claims 1-3, wherein the water inlet monitoring unit (60) also comprises a temperature sensor.

5. The water inlet monitoring unit (60) according to any of claims 1-4, wherein the water inlet monitoring unit (60) also comprises a sensor for measuring the surrounding temperature.

6. The water inlet monitoring unit (60) according to any of claims 1-5, wherein said one or more water quality measuring units are at least one sensor measuring water conductivity and/or turbidity, and/or a biosensor.

7. The water inlet monitoring unit (60) according to any of the preceding claims, wherein said one or more flow measuring units are one low flow meter and one high flow meter.

8. The water inlet monitoring unit (60) according to any of the preceding claims, wherein the water inlet monitoring unit (60) comprises Bluetooth connection and Wi-Fi connection.

9. The water inlet monitoring unit (60) according to any of the preceding claims, wherein the water inlet monitoring unit (60) comprises an external power supply and a battery powered to maintain connectivity at a power shut down.

10. A water distribution system intended for domestic water usage, wherein said water distribution system comprises at least one water inlet monitoring unit (60) according to any of claims 1-9.

11. The water distribution system according to claim 10, wherein a flow through boiler is provided from a cold water supply to provide for hot water supply.

12. The water distribution system intended for domestic water usage, wherein said water distribution system comprises one water inlet monitoring unit (60) according to any of claims 1-9 for a hot water inlet and one water inlet monitoring unit (60) according to any of claims 1-9 for a cold water inlet.

13. A method for detecting a potential leak or a leak in progress, said method comprising monitoring the flow behavior over time in a water inlet monitoring unit (60) according to any of claims 1-9 linked to water usage in one or more water usage units.

14. The method according to claim 13, wherein the method comprises comparing a specific flow behavior with the flow behavior over time and if there is a difference in the specific flow behavior compared to the flow behavior over time then sends an alarm to a user.

15. The method according to claim 13 or 14, wherein the method also comprises measuring the surrounding temperature to enable to send an alarm when there is a frost risk or legionella growth risk.

16. A method comprising using a water inlet monitoring unit (60) according to any of claims 1-9, for measuring water quality over time.

The invention claimed is:

1. Leakage detector system comprising:
a sensor unit, said sensor unit comprising a moisture sensor and a transmitter;
an enclosing material embedding the sensor unit; and
a permanently installed charging unit comprising a battery, the charging unit arranged to enable charging of the sensor unit,
wherein the sensor unit is arranged on a sealed side of a moisture barrier and wherein the charging unit is arranged on the other side of the moisture barrier with respect to the sensor unit,
wherein the moisture sensor is a passive sensor, which is activated when getting into contact with moisture, and
wherein the leakage detector system is arranged to, in response to an external event, send a signal to the sensor unit to perform a measurement, wherein the external event is indicative of water being fed into a system,
wherein the leakage detector system is arranged to send a signal to the sensor unit to perform a measurement and send measurement data from the transmitter of the sensor unit to a receiver unit, and
wherein the receiver unit and the charging unit is one and the same unit.

2. Leakage detector system according to claim 1, wherein the enclosing material is an embedment arrangement, wherein the embedment arrangement is a hermetically sealing.

3. Leakage detector system according to claim 1, wherein the transmitter is arranged to enable to send a signal through the enclosing material.

4. Leakage detector system according to claim 1, wherein the enclosing material is at least a part of the moisture barrier.

5. Leakage detector system according to claim 1, wherein there is a wire connection between the charging unit and the sensor unit.

6. Leakage detector system according to claim 1, wherein there is a wireless connection between the charging unit and the sensor unit provided with key charging technology.

7. Leakage detector system according to claim 1, wherein the sensor unit comprises a chargeable battery or a super-capacitor.

8. Leakage detector system according to claim 1, wherein the leakage detector system is arranged with blue-tooth low energy (BLE) technology.

9. Leakage detector system according to claim 1, wherein the sensor unit is connected to a network bridge arranged to transfer data sent from the transmitter of the sensor unit.

10. Leakage detector system according to claim 1, wherein the charging unit is arranged with a wifi connection to send data.

11. Leakage detector system according to claim 1, wherein the moisture sensor is a near-field communication (NFC) sensor.

12. Leakage detector system according to claim 1, wherein the sensor unit also comprises a temperature sensor.

13. Leakage detector system according to claim 1, wherein the moisture sensor is arranged on the sealed side of the moisture barrier in close proximity to a floor drain unit.

14. Leakage detector system according to claim 1, wherein the sensor unit comprises one or more sensor wires.

15. Leakage detector system according to claim 14, wherein said one or more sensor wires is arranged around feed tubing.

16. Leakage detector system according to claim 1, wherein there is a protection holder arranged between the moisture sensor and the enclosing material.

17. Leakage detector system according to claim 1, wherein the leakage detector system is arranged on top of a floor material, and embedded in a layer of screed with the moisture barrier arranged on top of the layer of screed.

18. Leakage detector system according to claim 1, wherein the leakage detector system comprises at least two moisture sensors.

* * * * *